(12) United States Patent
Meyer (10) Patent No.: US 10,948,071 B2
(45) Date of Patent: Mar. 16, 2021

(54) BEARING ARRANGEMENT FOR A PLANET GEAR OF A PLANETARY GEAR SET

(71) Applicant: Flender GmbH, Bocholt (DE)

(72) Inventor: Thomas Meyer, Stolberg (DE)

(73) Assignee: FLENDER GMBH, Bocholt (DE)

( * ) Notice: Subject to any disclaimer, the term of this patent is extended or adjusted under 35 U.S.C. 154(b) by 25 days.

(21) Appl. No.: 16/339,663

(22) PCT Filed: Aug. 25, 2017

(86) PCT No.: PCT/EP2017/071459
§ 371 (c)(1),
(2) Date: Apr. 4, 2019

(87) PCT Pub. No.: WO2018/065150
PCT Pub. Date: Apr. 12, 2018

(65) Prior Publication Data
US 2019/0249766 A1    Aug. 15, 2019

(30) Foreign Application Priority Data

Oct. 5, 2016 (EP) ..................................... 16192407

(51) Int. Cl.
*F16H 57/04* (2010.01)
*F16H 57/08* (2006.01)
(Continued)

(52) U.S. Cl.
CPC ......... *F16H 57/0479* (2013.01); *F03D 15/00* (2016.05); *F03D 80/70* (2016.05);
(Continued)

(58) Field of Classification Search
CPC .. F16H 57/0479; F16H 57/043; F16H 57/486; F16H 57/082; F16H 2057/085;
(Continued)

(56) References Cited

U.S. PATENT DOCUMENTS 4,325,589 A * 4/1982 Hirt ..................... F16H 57/0479
384/375
4,756,212 A    7/1988 Fuehrer
(Continued)

FOREIGN PATENT DOCUMENTS

AT           512436 A1    8/2013
DE          1400991 B1    9/1970
(Continued)

OTHER PUBLICATIONS

PCT International Search Report and Written Opinion of International Searching Authority dated Nov. 20, 2017 corresponding to PCT International Application No. PCT/EP2017/071459 filed Aug. 25, 2017.

*Primary Examiner* — Leslie A Nicholson, III
(74) *Attorney, Agent, or Firm* — Henry M. Feiereisen LLC (57) ABSTRACT

A planetary gear set includes a slide bearing shell arranged on a planet gear axle, a planet gear mounted rotatably on the slide bearing shell and a planet carrier having a recess for receiving the planet gear axle. An axial disk is mounted in a floating manner between a web of the planet carrier and the planet gear in an axial direction and configured flat on an axially outer side facing the web of the planet carrier. A lubricant film between the axial disk and the planet gear ensures during normal operation hydrodynamic operation between the planet gear and the axial disk. A deficient lubrication is present between the axially outer side of the axial disk and the web of the planet carrier.

18 Claims, 5 Drawing Sheets

(51) Int. Cl.
    *F16C 17/04*      (2006.01)
    *F16C 17/18*      (2006.01)
    *F16C 33/10*      (2006.01)
    *F03D 80/70*      (2016.01)
    *F03D 15/00*      (2016.01)

(52) U.S. Cl.
    CPC ............ *F16C 17/045* (2013.01); *F16C 17/18* (2013.01); *F16C 33/1045* (2013.01); *F16H 57/043* (2013.01); *F16H 57/0486* (2013.01); *F16H 57/082* (2013.01); *F05B 2240/50* (2013.01); *F05B 2260/40311* (2013.01); *F16C 2360/31* (2013.01); *F16C 2361/61* (2013.01); *F16C 2361/65* (2013.01); *F16H 2057/085* (2013.01); *Y02E 10/72* (2013.01)

(58) Field of Classification Search
    CPC ........ F03D 15/00; F03D 80/70; F16C 17/045; F16C 17/18; F16C 33/1045; F16C 2360/31; F16C 2361/61; F16C 2361/65; F05B 2240/50; F05B 2260/40311; Y02E 10/722
    USPC .......................................... 475/331
    See application file for complete search history.

(56) References Cited

U.S. PATENT DOCUMENTS

| | | | |
|---|---|---|---|
| 4,776,237 A * | 10/1988 | Premiski | F16C 33/6659 475/159 |
| 5,302,160 A | 4/1994 | Fujioka | |
| 5,356,352 A | 10/1994 | Sakamoto et al. | |
| 6,592,490 B2 * | 7/2003 | Olson | F16C 19/46 384/112 |
| 8,062,165 B2 * | 11/2011 | Chen | F16C 17/04 475/331 |
| 8,840,521 B2 * | 9/2014 | Kari | F16C 33/201 475/331 |
| 8,858,382 B2 * | 10/2014 | Smith | F16H 57/0471 475/160 |
| 9,447,819 B2 * | 9/2016 | Dehne | F16C 17/18 |
| 10,107,333 B2 * | 10/2018 | Kruhoffer | F16C 17/02 |
| 2010/0178166 A1 | 7/2010 | Ammann et al. | |
| 2012/0108380 A1 | 5/2012 | Dinter et al. | |
| 2012/0114488 A1 * | 5/2012 | Giger | F03D 80/70 416/170 R |
| 2013/0217535 A1 | 8/2013 | Suzuki et al. | |
| 2015/0337949 A1 | 11/2015 | Ziegler et al. | |
| 2017/0356493 A1 | 12/2017 | Kruhoffer et al. | |

FOREIGN PATENT DOCUMENTS

| | | |
|---|---|---|
| DE | 4009968 A1 | 11/1990 |
| DE | 19902565 A1 | 7/2000 |
| DE | 102008010307 A1 | 6/2009 |
| DE | 202011109762 U1 | 4/2012 |
| DE | 102012210689 A1 | 4/2014 |
| DE | 102015201248 B3 | 6/2016 |
| EP | 0274874 A2 | 7/1988 |
| EP | 2042753 A1 | 4/2009 |
| EP | 2383480 A1 | 11/2011 |
| EP | 2514970 A1 | 10/2012 |
| JP | 2010256778 A | 11/2010 |
| WO | WO 2004079230 A1 | 9/2004 |
| WO | WO 2009141140 A2 | 11/2009 |
| WO | WO 2014117196 A1 | 8/2014 |
| WO | WO 2015058749 A1 | 4/2015 |

* cited by examiner

BEARING ARRANGEMENT FOR A PLANET GEAR OF A PLANETARY GEAR SET

CROSS-REFERENCES TO RELATED APPLICATIONS

This application is the U.S. National Stage of International Application No. PCT/EP2017/071459, filed Aug. 25, 2017, which designated the United States and has been published as International Publication No. WO 2018/065150 and which claims the priority of European Patent Application, Serial No. 16192407.1, filed Oct. 5, 2016, pursuant to 35 U.S.C. 119(a)-(d).

BACKGROUND OF THE INVENTION

The invention relates to a planetary gear set with a planet gear which is received in an improved bearing arrangement. The invention also relates to a wind power plant, which is equipped with a corresponding planetary gear set.

EP 2 383 480 A1 discloses a planetary gear set for a wind power plant, which comprises a planet gear which is mounted rotatably on an axis received in a web of a planet carrier. An axial slide bearing is received between the planet gear and the web of the planet carrier. Such axial slide bearings are connected in a force-fit or form-fit manner with the webs of the planet carrier.

The publication EP 2 042 753 A1 discloses a hydrodynamic axial bearing for mounting a shaft of an exhaust gas turbo charger. The hydrodynamic axial bearing comprises a floating disk, which is provided with a profiling on both sides. The profiling comprises a number of wedge surfaces ascending in the peripheral direction, each with an adjoining locking surface. An oil groove is also embodied in the region of the wedge surfaces.

One significant disadvantage of the known bearing arrangements for planet gears consists in a force-fit or form-fit connection, for instance a screw connection, between an axial slide bearing and a planet carrier web requiring a significant assembly outlay. One significant disadvantage of profiled floating disks, in the case of low rotational speeds of below 100 rpm for instance, consists in these having a tendency to run dry on the side of the planet gear or the planet carrier, which results in increased wear. There is the need for a planetary gear set, which overcomes the disadvantages from the known prior art, which offers minimum wear and high reliability and at the same time is simple and quick to assemble. The need for a planetary gear set which is improved in this way consists in particular for the construction of wind power plants.

SUMMARY OF THE INVENTION

This object is achieved by the inventive planetary gear set. The planetary gear set comprises a sun shaft with a sun gear, a planet carrier with at least one planet gear and an annulus gear in which the planet gears run. The planet carrier has a recess, in which a planet gear axe s received which s used for rotatably mounting a planet gear. To this end, a slide bearing shell is arranged on the planet gear axle. The recess is embodied in a web of the planet carrier. A sleeve, by way of which a lubricant is supplied, also arranged on the planet gear axle for rotatable mounting purposes. An axial disk which is mounted in a floating manner is arranged between the web of the planet carrier and the planet gear. As a result, during normal operation there is no contact between the axial disk and the web of the planet carrier and the planet gear. Here the axial disk is embodied to be flat at least on a side which faces the web of the planet carrier. The flat form of the axial disk comprises that the end face of the axial disk always forms a plane which lies substantially at right angles to an axis of rotation, about which the planet gear rotates. As a result of the flat form, the axial disk is free of wedge surfaces or ramp surfaces which rise or fail in the peripheral direction.

The floating bearing arrangement ensures, assisted by the lubricant, that the planet gear can be rotated with minimal friction. On account of the floating bearing of the axial disk, in the inventive planetary gear set, this does not require a force-fit form connection with the web of the planet carrier. As a result, it is also possible to dispense with boreholes in the web of the planet carrier for receiving fastening means, for instance screws. This prevents weakenings in the material of the web of the planet carrier, which overall allows for a more efficient construction of the planet carrier. Furthermore, there is only a reduced working space available in the region of the planet carrier, which significantly hampers assembly work on the bearing arrangement of a planet gear. The inventive solution dispenses with this expensive assembly and maintenance work. Furthermore, the flat form of the axial disk on the side facing the web of the planet carrier prevents an edge resting on the web of the planet carrier when the axial disk is tilted or slanted. An essentially linear contact between the web of the planet carrier and an edge on the axial disk results in friction wear on the web of the planet carrier. Consequently, when the axial disk is tilted or slanted, linear contact may be made with the planet gear and/or the planet carrier. Such a linear contact results in an abrasion of an existing lubricant film in contact with the planet carrier. A dry-running which thus ensues may result in excessively high wear, which reduces the service life and thus also the reliability of the planetary gear set. The flat form of the axial disk on the side facing the web of the planet carrier results in a substantially planar contact with the web of the planet carrier when the axial disk is tilted or slanted on its radial outer edge. The friction wear on the web of the planet carrier is therefore reduced. An abrasion of the lubricant film is also prevented on the planet gear. In addition, the flat form of the axial disk can be produced easily and quickly. These advantages are achieved in the inventive planetary gear set also with a low rotational speed, for instance below 100 rpm. The inventive solution offers an increased service life, reliability and ease of installation with a reduced manufacturing effort even with low rotational speeds.

Furthermore, the axial disk, the planet gear and a lubricant supply can be designed in the region of the axial disk so that during normal operation a lubricant film is present between the axial disk and the planet gear, which ensures hydrodynamic operation between the planet gear and the axial disk. In this regard hydrodynamic operation is understood to be an operation in which a lubricant film is present between the participating components, here therefore the axial disk and the planet gear, in which the surface unevennesses of the components do not touch. To this end, a lubricant supply with adequate lubricant conveyor capability is arranged in the region of the planet gear and/or the axial disk. Furthermore, the axial disk and the planet gear have a suitable axial distance and in each case a suitable surface.

In a further embodiment of the invention, the axial disk, the planet gear and the lubricant supply are designed such that an ingress of lubricant between the axial disk and the web of the planet carrier is reduced to a minimum or prevented completely. This is carried out by a flatness of the web of the planet carrier in the region of the axial disk, wherein a planar supporting surface is produced, which is essentially tight with respect to lubricant. As a result, a higher friction coefficient is present between the axial disk and the web of the planet carrier than in the lubricant film between the planet gear and the axial disk. During normal operation, only one rotation with a minimal rotational speed or no rotation is present between the axial disk and the web of the planet carrier. As a result of the minimized rotational speed of the axial disk, only minimized wear also occurs between the web of the planet carrier and the axial disk. With a rotational speed of the axial disk of zero, no wear occurs in cooperation with the web of the planet carrier. Dispensing with a hydrodynamic operation between the axial disk and the web of the planet carrier therefore results in a structural simplification without negatively affecting the wear behavior.

In a preferred embodiment of the invention, the axial disk can have a first thickness of 6 mm to 20 mm.

Such a thickness is less than the thickness of known floating disks with lubricating wedges. The inventive solution is therefore space-saving in the axial direction, which overall allows for a more compact construction of the planetary gear set.

Furthermore, in the claimed planetary gear set at least one of the two sides of the axial disks can be embodied to be continuously flat. Here the respective end face of the axial disk forms a continuous surface free of elevations and/or depressions. Both sides are particularly preferably embodied to be continuously flat. An axial disk of this type has a high degree of deformability, so that when the axial disk is tilted or slanted between this and an adjacent component, in other words the web of the planet carrier and/or the planet gear, an enlarged contact surface is present. Such a planar contact has a particularly minimized tendency to abrade a lubricant film. Furthermore, an axial disk of this type can be produced particularly easily and economically.

Alternatively, at least one of the sides of the axial disk, preferably the side facing the planet gear, can have at least one first segment with a first thickness. Here the first segment essentially forms a ring segment of the axial disk. Furthermore, the side also has a second segment with a second thickness. The second segment is also essentially embodied as a ring segment of the axial disk. A plurality of first and second segments, which lie immediately adjacent to one another, form a step gap between the axial disk and the planet gear. The step gap offers a high degree of load capacity. At the same time, an axial disk with first and second segments with in each case a first and second thickness can be produced easily and cost-effectively. The axial disk can therefore also easily be readily adjusted to challenging applications with regards to load capacity, such as for instance wind power plants.

In the inventive planetary gear set, the first thickness and an axial distance between the planet gear and the web of the planet carrier are preferably embodied such that a clearance fit is present between these. This ensures adequate play between the axial disk which allows for mounting in a floating fashion. The play is selected here by taking into account the deformation of the web of the planet carrier and the planet gear in the assembled state. The space remaining during normal operation between the planet gear and the axial disk is dimensioned such that a lubricant film which is adequately thick for a hydrodynamic operation can be formed. The remaining space between the axial disk and the planet gear is at the same time sufficiently narrow to prevent excess loss of lubricant. The simple form of the axial disk therefore allows a corresponding clearance fit to be produced in a simple manner by way of just one constructive parameter, namely the first thickness.

The clearance fit preferably corresponds essentially to a deformation of the axial disk in the axial direction, which is produced during normal operation as a result of the mechanical load of the axial disk. The clearance fit of the deformation particularly preferably corresponds to the axial disk in the axial direction during normal operation in addition to a manufacturing tolerance of 0.2 mm to 0.6 mm.

In the inventive planetary gear set, the axial disk can have at least one recess which is continuous in the axial direction, for instance a borehole. The continuous recess allows lubricant to be transported from the side of the axial disk facing the planet gear to its side facing the planet carrier. An adequate deficient lubrication can also be produced hereby between the web of the planet carrier and the axial disk, so that the wear between these two components is further reduced.

A dispensing device for dispensing the lubricant can further preferably be arranged in the inventive planetary gear set on a radially outer and/or radially inner side of the axial disk. A dispensing device on the radially inner side of the axial disk can be embodied for instance as an opening in the planet gear axle, in a sleeve on the planet gear axle or a gap between the planet gear and the sleeve. A dispensing device for lubricant on the radially outer side of the axial disk can be an opening in the web of the planet carrier, for instance. In the inventive planetary gear set the axial disk can therefore be supplied with lubricant with available means without further measures. The inventive solution can subsequently be readily implemented in existing planetary gear sets following a retrofit.

Furthermore, in a preferred embodiment the planetary gear set has a corresponding axial disk on both sides of the planet gear. In this way, a borehole for receiving fastening means and installation space is spared on both sides of the planet gear. The assembly and repair of the planetary gear set is thus further simplified and the technical advantages of the invention are achieved to a particularly high degree. In particular, excessive wear by the axial disk is prevented, so that the reliability of the planetary gear set is increased further.

The outlined object is also achieved by an inventive wind power plant. The wind power plant has a nacelle, which is connected mechanically to a rotor. The rotor is coupled mechanically via a planetary gear set to a generator in order to convert a rotational movement of the rotor into electricity. The planetary gear set between the rotor and the generator is embodied in accordance with the invention in accordance with one of the afore-cited embodiments. The technical advantages of the inventive planetary gear set, in particular the increased reliability and simplification of assembly and repair work with at the same time a cost-efficient production are particularly important in wind power plants.

BRIEF DESCRIPTION OF THE DRAWING

The invention is explained in more detail below on the basis of the embodiments in FIGS. 1 to 5, in which, shown in detail

DETAILED DESCRIPTION OF PREFERRED EMBODIMENTS

Figure 1:
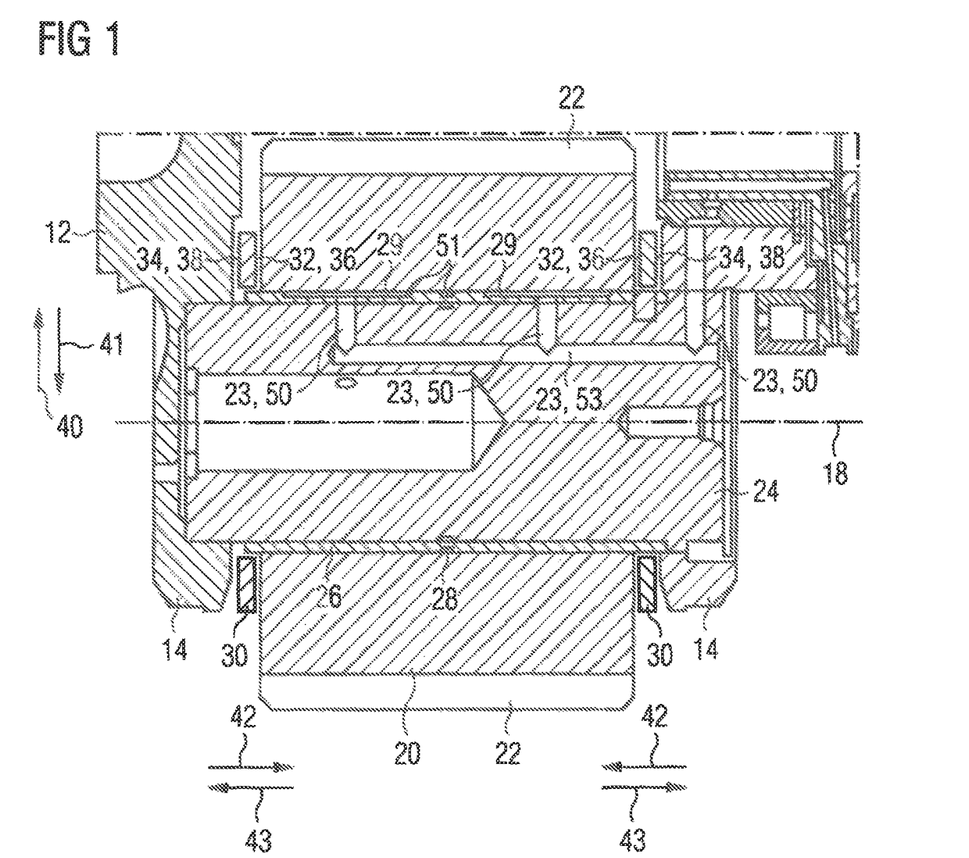
FIG. 1 shows a cross-sectional view of a planet gear bearing arrangement in an inventive planetary gear set.

FIG. 1 shows a schematic representation of a cross-sectional view of a planet gear bearing arrangement in an inventive planetary gear set 10. The planetary gear set 10 comprises a planet carrier 12, to which a web 14 belongs, in which a planet gear axle 24 is received. The planet gear axle 24 has cavities 23 connected hydraulically, which serve to convey a lubricant 50. A planet gear 20 is mounted on the planet gear axle 24 so as to be rotatable about an axis of rotation 18. Here the planet gear 20 slides on a film 51 made of lubricant 50. Film 51 is formed by a peripheral lubricant gap 28 and lubricant pockets 29, which are embodied in the slide bearing shell 26. The planet gear 20 is mounted in the radial direction by means of the slide bearing shell 26. With respect to the planet gear 20, a radially outer direction is shown in FIG. 1 by means of the arrow 40; a radially inner direction by means of the arrow 41. Mechanical stresses which are introduced into the planet gear 20 in the radial direction by way of a toothing 22 are received by the film 51 made from lubricant 50, the slide bearing shell 26 and the planet gear axle 24. The planet gear 20 is movable against the axial direction on the planet gear axle 24. The axially inner direction is shown in FIG. 1 by means of the arrow 42; the axially outer direction by means of the arrow 43. An axial disk 30 is arranged between the planet gear 20 and the web 14 of the planet carrier 12, viewed in the axial direction, on each side of the planet gear 20.

The axial disks 30 are each arranged between the web 14 of the planet carrier 12 and the planet gear 20. The axial disks 30 are dimensioned here such that a floating bearing arrangement of the axial disks 30 exists. The axial disks 30 are therefore not fixed by any further construction element and are movable in an axially inner direction 42 and an axially outer direction 43. During normal operation, lubrication 36 is present between the planet gear 20 and the axially inner side 32 of the axial disk 30 as a result of emerging lubricant 50, which allows for a hydrodynamic operation. At most a minimum amount of lubricant 50, so that a deficient lubrication 38 is present here, is present between the axially outer side 34 of the axial disk 30 and the web 14 of the planet carrier 12. As a result of the deficient lubrication 38, there is an increased friction coefficient between the web 14 of the planet carrier 12 and the axially outer side 34 of the axial disk 30. A reduced friction coefficient is present on the axially inner side 32 of the axial disk 30 in cooperation with the planet gear 20. A reduced relative rotation or no relative rotation is present here between the axial disk 30 and the web 14 of the planet carrier 12 with low rotational speeds, for instance below 100 rpm. A relative rotation is by contrast present between the axial disk 30 and the planet gear 20, which essentially corresponds to a rotational speed of the planet gear 20.

Figure 2:
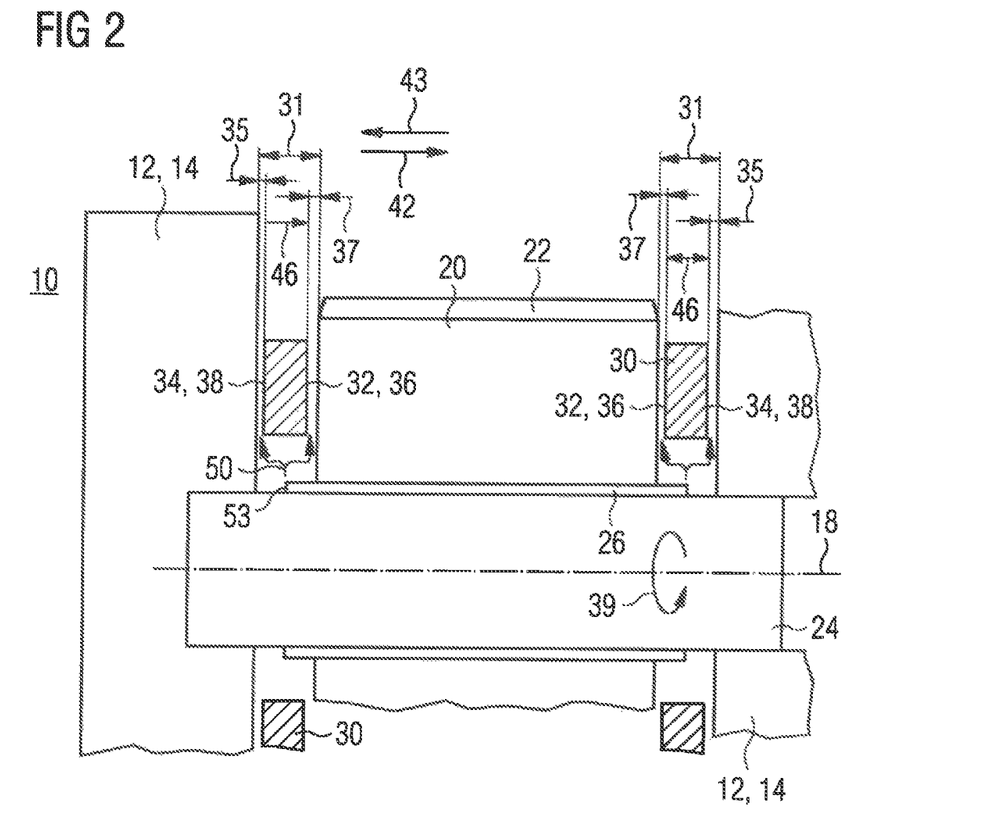
FIG. 2 shows a detailed view of the planet gear bearing arrangement according to FIG. 1.

FIG. 2 shows a detailed view of the cross-sectional view from FIG. 1, The same reference characters have the same meaning in FIG. 1 and FIG. 2. The detailed view according to FIG. 2 shows the position of the axial disk 30 in the inventive planetary gear set 10. The axial distance 35 between the axial disk 30 and the web 14 of the planet carrier 12 is reduced so that the radially outer side of the axial disk 30 in the direction of arrow 40 inhibits or prevents the passage of lubricant 50 along the web 14 of the planet carrier 12. Consequently, the deficient lubrication 38 is present between the axial disk 30 and the web 14 of the planet carrier 12. The lubricant 50 enters, the region of the axial disk 30 from an axial end region of the sleeve 26. The reduced flow of lubricant 50 between the axial disk 30 and the web 14 of the planet carrier 12 is shown in FIG. 2 by a small, branched arrow 50. The axial distance 37 between the axially inner side 32 of the axial disk 30 and the planet gear 20 is conversely larger than the axial distance 35 on the opposite side 34 of the axial disk 30. This is ensured by an increased flow of lubricant 50, which ensues when the planet gear 20 is rotated about the axis of rotation 18.

An axial distance 31, which is partially filled by the axial disk 30, lies between the planet gear 20 and the web 14 of the planet carrier 12. The first thickness 46 of the axial disk 20 is adjusted here to the axial distance 31 between the planet gear 20 and the web 14 of the planet carrier 12 such that a clearance fit is present between the first thickness 46 and the axial distance 31. The clearance fit ensures an adequate play for the axial disk 30 in the axially inner and outer direction 42, 43 in order to ensure a deficient lubrication 38 and a lubrication 36 on the respective sides 32, 34 of the axial disk 30, which allows for a hydrodynamic operation. The play, which is produced in each case for the axial disks 30 in the form of the axial distances 35, 37 from the planet gear 20 and the webs 14 of the planet carrier 12, is established in each case during operation as a function of the deformation of the axial disk 30, the developing mechanical load of the axial disk 30 and the forces and torque balance in the axial disk 30 resulting therefrom. The floating mounting of the axial disks 30 and of the planet gear 20 therefore result in a uniform wear load of the axial disks 30 and the planet carrier 12 on both sides. Overall, an increased service life is effected as a result.

Figure 3:
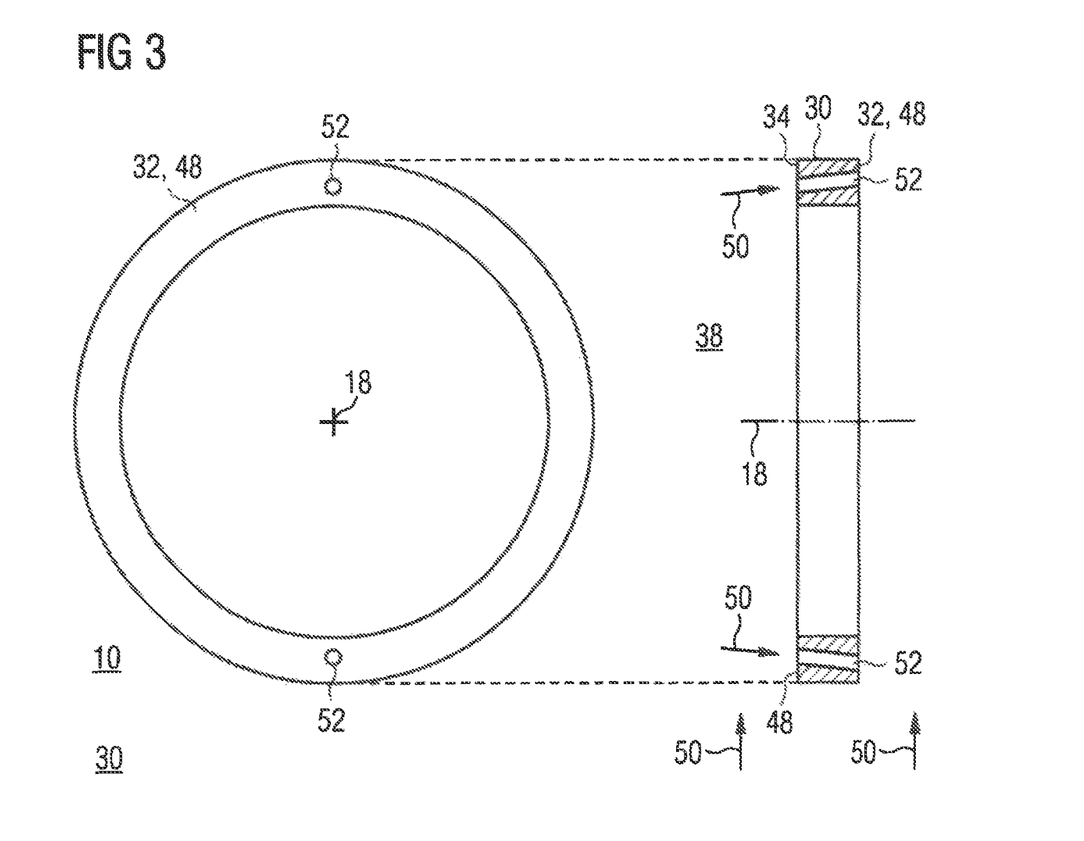
FIG. 3 shows a top view and sectional view of an axial disk in accordance with a first embodiment of the invention.

FIG. 3 shows a schematic representation of an axial disk 30 for a first embodiment of the inventive planetary gear set 10, such as shown in FIG. 1 or FIG. 2 for instance. The same reference characters are used for the same features in FIG. 3 as in FIG. 1 and FIG. 2. The axial disk 30 is essentially ring-shaped and has an end face 48 on each side 32, 34. One side 32 of the axial disk 30 is facing the planet gear 20 of the planetary gear set 10 in the installed state and the other side 34 is facing the web 14 of the planetary gear set 10. The end faces 48 are both embodied to be continuously flat. The end faces 48 therefore have no edges which, in a slanted position during operation of a planetary gear set 10, may come into linear contact with the planet gear 20 or the web 14 of the planet carrier 12, A permanent tilting or slanting of the axial disk 30, with which the lubricant 50 is abraded from the planet gear 20, cannot occur with the axial disk 30. The axial disk 30 also has two continuous recesses 52, which allow lubricant 50 to pass from the axially inner side 32 onto the axially outer side 34 of the axial disk 30. In this way a deficient lubrication 38 present on the axially outer side 34 can additionally be supplied with lubricant 50 as in FIG. 1 or FIG. 2. An additional supply of lubricant 50 to a deficient lubrication 38 allows the wear occurring there also to be reduced at low rotational speeds, for instance below 100 rpm. The continuous recesses 52 are embodied inclined with respect to the axis of rotation 18. The axial disk 30 according to FIG. 3 is simple and cost-efficient to manufacture and offers a high degree of safety against a slanting in the inventive planetary gear set 10.

Figure 4:
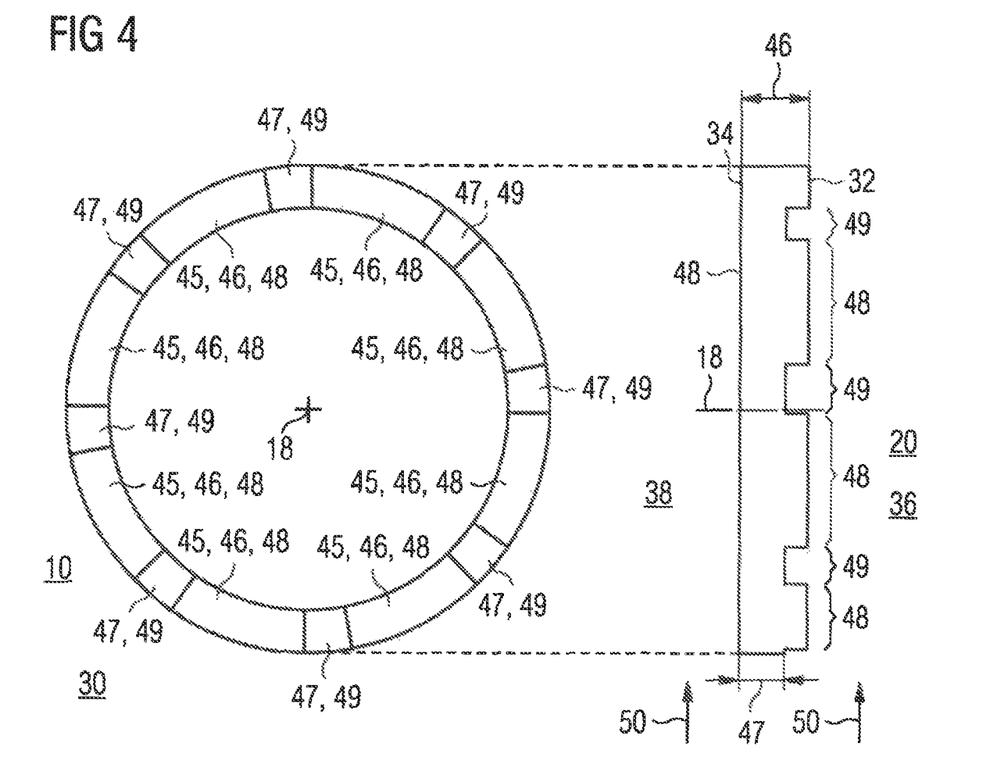
FIG. 4 shows a top view and side view of a second embodiment of the invention.

FIG. 4 shows a schematic representation of an axial disk 30 according to a second embodiment of the invention. The axial disk 30 can be used in a planetary gear set 10 as shown in FIG. 1 and FIG. 2. The same features as in FIG. 1 and FIG. 2 have the same reference characters in FIG. 3. The axial disk 30 is essentially ring-shaped and has an end face 48 on the side 32 which faces a planet gear 20 in the inventive planetary gear set 10, which has a plurality of first and second segments 45, 49. The first and second segments 45, 49 subdivide the end face 48 of the axial disk 30 and in each case have a first and a second thickness 46, 47. The first thickness 46 is greater here than the second thickness 47. As a result, a step gap which offers an increased mechanical load capacity is produced on the side 32 of the axial disk 30 which faces the planet gear 20. Consequently, the axial disk 30 according to FIG. 4 is able to withstand increased forces in an axial direction parallel to the axis of rotation 18. The end face 48 on the side 34 of the axial disk 30 facing the web 14 of the planet carrier 12 is embodied to be continuously flat. A lubrication 36 between the planet gear 20 and the axial disk 30 is reliably ensured, which allows for a hydrodynamic operation and which only invokes minimum wear.

The flat end face 48 on the side 34 facing the web 14 is free of edges, which invoke a linear contact when the axial disk 30 on the planet carrier 12 is slanted, and can thus cause increased friction wear. The flat end face 48 on the side 34 facing the web 14 essentially lies in a planar manner on the planet carrier 12 and minimizes a flow of lubricant 50.

Figure 5:
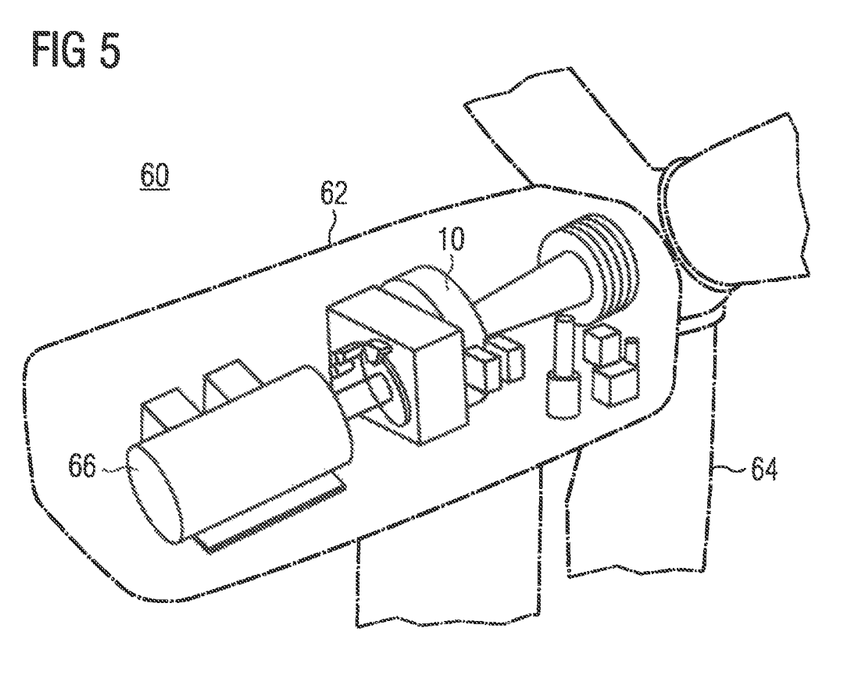
FIG. 5 shows a schematic representation of a cut oblique view of a wind power plant with an inventive planetary gear set.

FIG. 5 shows a schematic representation of a cut oblique view of an inventive wind power plant 60. The wind power plant 60 has a nacelle 62, which is connected to a rotor 64. The rotor 64 is coupled via a planetary gear set 10 to a generator 66 which is used for power generation. The planetary gear set 10 is embodied in accordance with one of the afore described embodiments.

What is claimed is:

1. A planetary gear set, comprising:
   a planet gear axle;
   a slide bearing shell arranged on the planet gear axle;
   a planet gear mounted rotatably on the slide bearing shell;
   a planet carrier having a recess for receiving the planet gear axle;
   an axial disk mounted in a floating manner between a web of the planet carrier and the planet gear in an axial direction, said axial disk being configured flat on a first side facing the web of the planet carrier;
   a lubrication between the axial disk and the planet gear during normal operation to ensure hydrodynamic operation between the planet gear and the axial disk; and
   a deficient lubrication between the first side of the axial disk and the web of the planet carrier,
   wherein the axial disk is configured flat on a second side facing the planet gear to realize the deficient lubrication between the web of the planet carrier and the axial disk,
   wherein at least one of the first and second sides of the axial disk is configured continuously flat.

2. The planetary gear set of claim 1, wherein the axial disk has a thickness of 6 mm to 20 mm.

3. The planetary gear set of claim 1, wherein the axial disk is configured on at least one of the first and second sides with a first segment having a first thickness and a second segment having a second thickness.

4. The planetary gear set of claim 3, wherein the first thickness is 6 mm to 20 mm.

5. The planetary gear set of claim 2, wherein the web of the planet carrier and the planet gear are spaced from one another by an axial distance, with a clearance fit established between the thickness of the axial disk and the axial distance.

6. The planetary gear set of claim 5, wherein the clearance fit corresponds to a deformation of the axial disk in the axial direction.

7. The planetary gear set of claim 1, wherein the axial disk has a recess which is continuous in the axial direction.

8. The planetary gear set of claim 1, further comprising a dispensing device configured to dispense a lubricant and arranged on at least one of a radially inner side and radially outer side of the axial disk.

9. The planetary gear set of claim 1, further comprising a further axial disk, the axial disk and the further axial disk being arranged on both sides of the planet gear.

10. A wind power plant, comprising:
    a nacelle including a rotor;
    a generator; and
    a planetary gear set mechanically coupling the rotor to the generator, said planetary gear set comprising a planet gear axle, a slide bearing shell arranged on the planet gear axle, a planet gear mounted rotatably on the slide bearing shell, a planet carrier having a recess for receiving the planet gear axle, an axial disk mounted in a floating manner between a web of the planet carrier and the planet gear in an axial direction, said axial disk being configured flat on a first side facing the web of the planet carrier, a lubrication between the axial disk and the planet gear during normal operation to ensure hydrodynamic operation between the planet gear and the axial disk, and a deficient lubrication between the first side of the axial disk and the web of the planet carrier,
    wherein the axial disk is configured flat on a second side facing the planet gear to realize the deficient lubrication between the web of the planet carrier and the axial disk,
    wherein at least one of the first and second sides of the axial disk is configured continuously flat.

11. The wind power plant of claim 10, wherein the axial disk is configured on at least one of the first and second sides with a first segment having a first thickness and a second segment having a second thickness.

12. The wind power plant of claim 11, wherein the web of the planet carrier and the planet gear are spaced from one another by an axial distance, with a clearance fit established between the first thickness of the axial disk and the axial distance.

13. The wind power plant of claim 12, wherein the clearance fit corresponds to a deformation of the axial disk in the axial direction.

14. The wind power plant of claim 10, wherein the axial disk has a recess which is continuous in the axial direction.

15. The wind power plant of claim 10, wherein the planetary gear set includes a dispensing device configured to dispense a lubricant and arranged on at least one of a radially inner side and radially outer side of the axial disk.

16. The wind power plant of claim 10, wherein the planetary gear set includes a further axial disk, the axial disk and the further axial disk being arranged on both sides of the planet gear.

17. A planetary gear set, comprising:
    a planet gear axle;
    a slide bearing shell arranged on the planet gear axle;
    a planet gear mounted rotatably on the slide bearing shell;
    a planet carrier having a recess for receiving the planet gear axle;

an axial disk mounted in a floating manner between a web of the planet carrier and the planet gear in an axial direction, said axial disk being configured flat on a first side facing the web of the planet carrier;

a lubrication between the axial disk and the planet gear during normal operation to ensure hydrodynamic operation between the planet gear and the axial disk; and a deficient lubrication between the first side of the axial disk and the web of the planet carrier, wherein the axial disk is configured flat on a second side facing the planet gear to realize the deficient lubrication between the web of the planet carrier and the axial disk, wherein the axial disk is configured on at least one of the first and second sides with a first segment having a first thickness and a second segment having a second thickness.

18. A wind power plant, comprising:

a nacelle including a rotor;

a generator; and a planetary gear set mechanically coupling the rotor to the generator, said planetary gear set comprising a planet gear axle, a slide bearing shell arranged on the planet gear axle, a planet gear mounted rotatably on the slide bearing shell, a planet carrier having a recess for receiving the planet gear axle, an axial disk mounted in a floating manner between a web of the planet carrier and the planet gear in an axial direction, said axial disk being configured flat on a first side facing the web of the planet carrier, a lubrication between the axial disk and the planet gear during normal operation to ensure hydrodynamic operation between the planet gear and the axial disk, and a deficient lubrication between the first side of the axial disk and the web of the planet carrier, wherein the axial disk is configured flat on a second side facing the planet gear to realize the deficient lubrication between the web of the planet carrier and the axial disk, wherein the axial disk is configured on at least one of the first and second sides with a first segment having a first thickness and a second segment having a second thickness.

* * * * *